United States Patent [19]

Poston, Jr.

[11] 3,728,671
[45] Apr. 17, 1973

[54] MULTIPLE-ELECTRODE, DIRECTIONAL, ACOUSTIC SOURCE

[75] Inventor: Adolph M. Poston, Jr., Petaluma, Calif.

[73] Assignee: The United States of America as represented by the Secretary of the Interior

[22] Filed: Apr. 30, 1970

[21] Appl. No.: 33,453

[52] U.S. Cl.........340/12 SD, 181/.5 EM, 181/.5 XC
[51] Int. Cl. ..............................................G01v 1/00
[58] Field of Search ........................340/12 SD, 7 R; 181/.5 EM, .5 XC

[56] References Cited

UNITED STATES PATENTS

| 1,500,243 | 7/1924 | Hammond, Jr. | 340/12 SD |
| 2,660,556 | 11/1953 | Butler | 340/12 SD |
| 3,245,032 | 4/1966 | Knott et al. | 340/12 SD |
| 1,758,993 | 5/1930 | Wolff | 340/12 SD |
| 3,283,294 | 11/1966 | Schrom | 340/12 SD |
| 3,537,542 | 11/1970 | Droyan et al. | 340/12 SD |
| 3,286,226 | 11/1966 | Kearsley et al. | 181/.5 EM |
| 3,416,128 | 12/1968 | Allen | 340/12 SD |
| 3,588,580 | 6/1971 | Vining | 340/12 SD |

Primary Examiner—Benjamin A. Borchelt
Assistant Examiner—Harold Tudor
Attorney—Ernest S. Cohen and Gersten Sadowsky

[57] ABSTRACT

Concentric electrode pairs of opposite polarity improve the efficiency of a spark-gap acoustic source for marine seismic profiling. One electrode of a pair is tubular; the other is rod-like and positioned axially within the tubular electrode. Among the benefits resulting from the concentric electrode configuration are constant output, directional control, high frequency, efficiency, and a high repetition rate.

1 Claim, 3 Drawing Figures

PATENTED APR 17 1973 3,728,671

INVENTOR
ADOLPH M. POSTON, JR.

BY Ernest S. Cohen
Albert C. Fashinski

ATTORNEYS

MULTIPLE-ELECTRODE, DIRECTIONAL, ACOUSTIC SOURCE

BACKGROUND OF THE INVENTION

Seismic profiling is a technique for determining the nature and thickness of geologic structures. In a typical marine seismic profiling operation, a vessel tows an acoustic source and a receiving hydrophone through a body of water. Sound waves generated by the acoustic source are transmitted through the water to the sediment layers below. Depending upon sediment thickness and structure, the incident waves reflect with varying intensity and spacing to the receiving hydrophone. In response to these reflected waves, electrical impulses are generated by the hydrophone and sequentially recorded in a correlated pattern representing the submerged geologic structure.

Among the many perameters affecting quality in seismic profiling is the nature and precision of the sound waves generated by the acoustic source. If the incident waves fluctuate in frequency and intensity, the reflected waves are correspondingly deformed. When the signal representing the reflected wave is recorded, these wave deformities ambiguously distort the seismic information. Prevention of this unwanted distortion requires an acoustic source capable of producing sound waves of precisely controlled frequency, duration, and intensity.

DESCRIPTION OF THE PRIOR ART

Numerous acoustic sources are available for continuous seismic profiling. Among them are piezoelectric crystals, gas exploders, air guns, and spark-gap sources. Each acoustic source has characteristic advantages for specific problems; and each has disadvantages, even while functioning at optimum efficiency. Because of many inherent advantages, the spark-gap source, in particular, is an appropriate subject for improvement toward optimum capability.

Prior spark-gap sources are primarily intended for deep to very deep acoustic penetration of the seafloor. For this purpose they produce high energy and low frequency components in their acoustic wave fronts. The high energy and low frequencies, however, are completely unsuitable for studying shallow water and thin sediment sections. In shallow water and over small geologic structures, high energy spark-gap sources produce spurious multiple reflections which degrade the quality of recorded data. Furthermore, the rapid high frequency acoustic discharge required for high resolution of shallow structures and thin bedded sediments is not possible with high energy sources.

Adding to their unsuitability for some seismic profiling applications, prior spark-gap sources are generally inefficient and inconvenient to use. Inefficiency results, in part, from their characteristic omnidirectional acoustic wave generation. Only a fraction of the total wave energy generated by prior spark-gap sources is usefully directed for reflection to the receiving hydrophone. The remainder is dissipated in all directions in the surrounding water. Since much of the acoustic energy is wasted, cumbersome high energy electric power supplies are required to produce sufficient energy for optimum results, inconveniently limiting operation of these inefficient acoustic sources to use with large vessels.

With all spark gap sources a bubble is formed by an electrical discharge between an oppositely polarized pair of electrodes. The bubble is composed of water vapor and hydrolysis products. Bubbles formed by prior art sources vary uncontrollably in size and shape, causing objectionable variations in acoustic wave intensity, and in the time interval between the initial electrical pulse and subsequent bubble formation and collapse. Sound waves produced in this manner lack the predictable precision necessary for accurate, high resolution, seismic profiling.

SUMMARY OF THE INVENTION

This invention is an acoustic source for marine seismic profiling. When submerged in a conducting fluid, the acoustic source generates an acoustic pressure pulse each time sufficient electrical potential appears between oppositely polarized pairs of electrodes. One electrode of each pair is a cylindrical tube, open at one end. The other electrode is a rod-like, wire filament, axially positioned within the tube, and surrounded by electrical insulation, except for a small exposed portion near the open end of the tube. In the preferred embodiment, a linearly aligned series of electrode pairs is mounted on a tubular support. During seismic profiling, the acoustic source is suspended horizontally in sea water by a float and towed behind a vessel, with the open end of each tubular electrode pointing downward.

The electrode configuration used in this invention produces a superior result in comparison to prior spark-gap acoustic sources. Alignment of the concentric electrode pairs is preserved even though erosion of the inner electrode occurs. As a result, a constant intensity spark is maintained throughout operation of the acoustic source. The restricted volume within the tubular electrode limits the size of bubbles formed at the spark-gap, controlling the intensity of the resulting acoustic wave. Highly directional wave propagation results from the downward orientation of the electrode pairs. A resonant organ-pipe effect during pulse generation in the electrode tubes results in higher frequency pulses than possible with conventional spark-gap electrodes. Because of their directional uniformity, pulses generated by the adjacent electrode pairs, contribute a uniform additive effect to the resultant acoustic wave. The acoustic power of the wave is variable by simply changing the number of electrodes employed. The frequency of the wave is variable by changing the dimensions of the tubular electrodes.

Through a superior electrode configuration, this invention enables a high repetition rate acoustic discharge with a constant output intensity suitable for seismic profiling in shallow marine environments. As it operates efficiently with minimal power requirements, the invention is suited for operation behind small vessels with lightweight power supplies.

Therefore, one object of this invention is an acoustic source with a concentric electrode configuration.

Another object of this invention is an acoustic source with an electrode configuration resulting in constant output regardless of normal electrode erosion.

Another object of this invention is an acoustic source with tubular electrodes that control bubble formation and wave intensity.

Another object of this invention is an acoustic source with a tubular electrode configuration for generating a directionally controlled acoustic wave.

Another object of this invention is an acoustic source for generating high frequency waves through a resonant organ-pipe effect.

Another object of this invention is an acoustic source having an aligned series of electrodes for generating an additive acoustic wave.

Another object of this invention is an acoustic source having a variable high frequency wave component.

Still another object of this invention is an efficient acoustic source having a high repetition rate and constant intensity output when operated with minimum power input.

These and other objects of the invention will be apparent in the following specification and drawing.

DESCRIPTION OF THE PREFERRED EMBODIMENT

Figure 1:
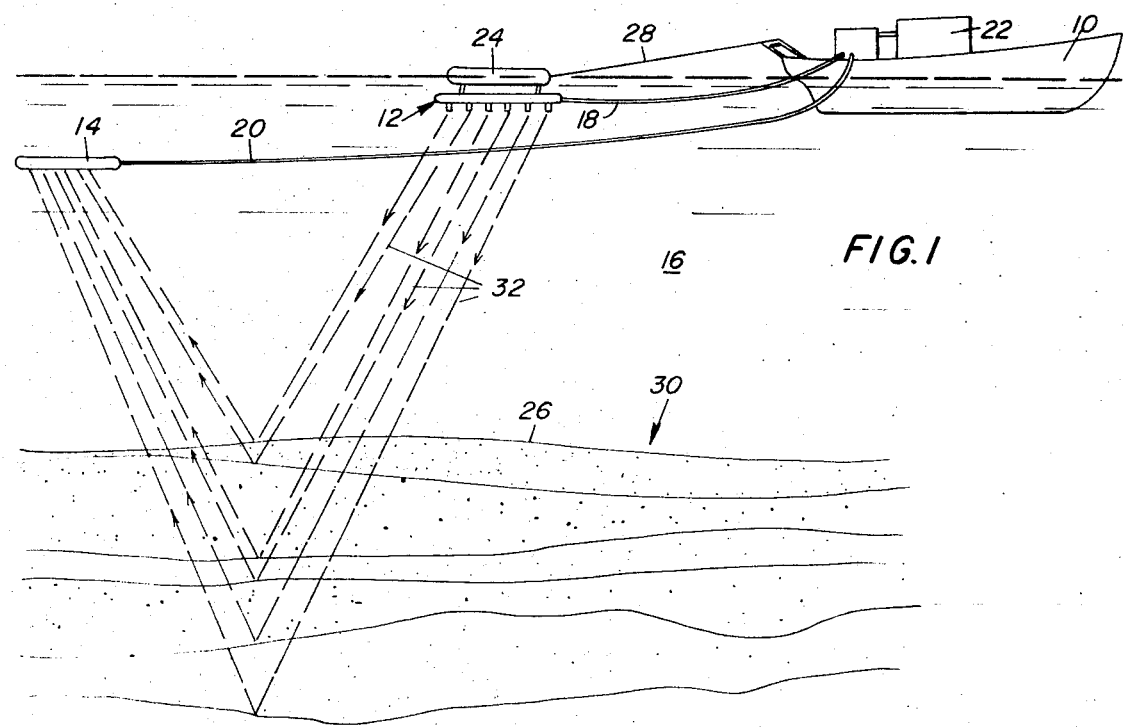
FIG. 1 is a lateral view of a typical seismic profiling operation.

A typical seismic profiling operation is shown in FIG. 1 where a vessel 10 tows an acoustic source 12 and a receiving hydrophone 14 through a body of water 16. Electrical cables 18 and 20 connect the source and hydrophone to electronic components 22 within the vessel. The hydrophone 14 floats freely in a submerged position behind the vessel, tethered by connecting cable 20, while the acoustic source 12 rides just below the water surface on a float 24. Stabilizing fins (not shown) and a torpedo-like shape maintain the float 24 and suspended acoustic source 12 in a horizontal orientation, substantially paralleling the bottom surface 26 below. A flexible towing cable 28 joins the float 24 and vessel 10, orienting the acoustic source 12 parallel to the direction of travel as the vessel advances through the water.

For measuring the layers of a geologic structure 30, sound waves 32 are transmitted from acoustic source 12 toward bottom surface 26. The sound waves reflect from the bottom and subsurface layers to receiving hydrophone 14, where their intensity and time of arrival are detected. Representative electrical impulses from the hydrophone travel along connecting cable 20 to electronic recording equipment in the vessel, making a permanent record of the seismic profile. Depending upon the nature and thickness of a reflecting layer the reflected wave varies in intensity and time of arrival. As the vessel proceeds, correlation of the recorded information from discrete reflected waves produces an accurate seismic profile, showing intensity variations by shading gradations, and arrival time by spaced separation of the seismic information across the recording sheet.

In the seismic profiling operation shown in FIG. 1, only those sound waves 32 passing through a narrow incident window are eventually reflected to the receiving hydrophone. Sound waves incident in other directions (not shown) are reflected out of receiving range. By directing a large percentage of the sound waves from the acoustic source through the incident window, inefficient dissipation of acoustic energy in areas away from the hydrophone is avoided. For this purpose, a directional acoustic source is desirable.

Figure 2:
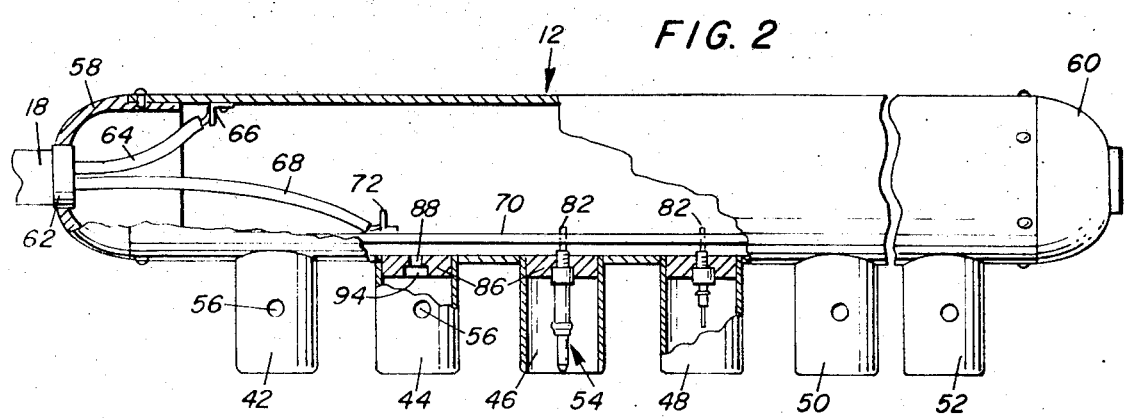
FIG. 2 is a partially sectioned lateral view of a multiple-electrode, directional, acoustic source.

In FIG. 2 a directional acoustic source 12 is shown in detail. Basically, the source 12 has a long tubular housing 40, on the side of which are mounted a linearly aligned series of downward projecting cylindrical tubes 42–52. Both the housing and tubes are electrically conductive, each individual tube acting as one electrode of a spark-gap pair. Concentrically positioned within each tube is a second, rod-like central electrode 54, as shown by the sectioned representation of tube 46. When the acoustic source 12 is immersed in a conducting fluid, such as salt water, and sufficient potential difference applied between the inner and outer electrodes, an electrical discharge, or spark, occurs in the gap between the electrodes. Fluid entering the gap through the open end of the tube, and through relief openings 56, is heated by the discharge, forming a rapidly expanding gaseous bubble. The generation and ultimate collapse of this bubble sends a sharp pressure pulse traveling through the conducting fluid. By applying a continuous pulsating potential difference between the electrode pair, a continuous acoustic wave is generated.

At opposite ends of the acoustic source 12, domed end-caps 58–60 seal the housing 40 to prevent fluid seepage from interfering with electrical operation of the electrode pairs. Electrical cable 18 enters the interior of housing 40 through a sealed opening 62 in end-cap 58. One conductor 64 of cable 18 is electrically coupled to housing 40 by a connecting clip 66. The other conductor 68 is electrically coupled to a bus bar 70 by a similar connecting clip 72. Since the housing 40 and electrode tubes 42–52 are all conductive, any potential difference between conductors 64 and 66 is transferred to the electrode tubes and bus bar 70. The inner electrode of each pair is insulated from the housing and surrounding tube, and coupled to the bus bar, making the inner and outer electrodes of opposite polarity corresponding to any potential difference between the conductors.

Figure 3:
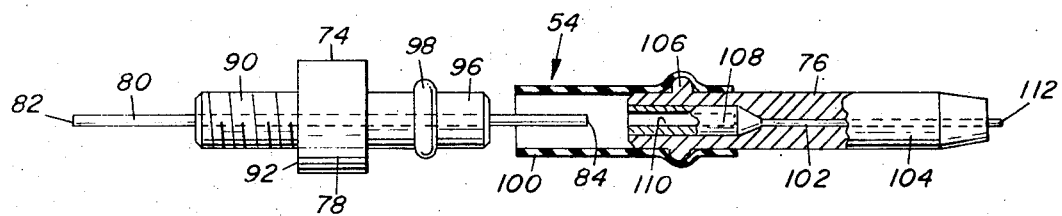
FIG. 3 is a partially sectioned lateral view of a rod-like electrode, shown generally in FIG. 2.

The rod-like inner electrode 54 is shown in detail in FIG. 3. A similar rod-like electrode is axially aligned within each electrode tube, even though, for descriptive convenience, only one inner electrode is shown in FIG. 2. Because the inner electrode gradually erodes with continued use, it is constructed in two sections, one 74 permanent and the other 76 replaceable. On the permanent electrode section 74 an insulating support 78 surrounds the central portion of a wire conductor 80. The conductor protrudes from the support at one end 82 where it joins the bus bar 70, and at the other end 84 where it joins the replaceable electrode section. For attaching the permanent electrode sections 74 to the housing 40, a mounting plate 86 is fixed at the closed end of each tubular electrode, as seen in FIG. 2. In the plate 88, a threaded aperture aligns with apertures through the housing and bus bar 70. A threaded shank 90 secures the permanent electrode section 74 within the aperture 88, while a raised shoulder 92 seats within a counter-bore 94 on the mounting plate, insuring accurate positioning and a fluid tight seal. For electrical continuity the conducting wire 80 is soldered to the bus bar 70.

On the end of permanent electrode section 74 opposite the threaded shank, there is a smooth shank 96 encircled at one point by a narrow raised bead 98. The smooth shank and raised bead cooperate with a flexible elastic tube 100 to join the permanent and replaceable electrode sections into a sealed structural unit.

In basic structure the replaceable electrode section 76 resembles the permanent section, having a central wire conductor 102 surrounded by an insulating sleeve 104. Near one end, sleeve 104 is encircled by a narrow raised bead 106, similar to bead 98. Within the same end of sleeve 104 is a broad end portion 108 of central conductor 102, with a deep axial bore 110. The diameter of bore 110 corresponds to the diameter of conducting wire 80 to insure a tight conductive joint when the permanent and replaceable electrode sections are assembled. To assemble the sections, one end of elastic tube 100 is slipped over raised bead 106, and the end 84 of conducting wire 80 is inserted into bore 110, while elastic tube 100 is slipped over raised bead 98. Axial alignment of the sections is insured by tight mating contact of conductors 80 and 102, and longitudinal alignment is insured by elastic tube 100. Fluid seepage into the joint between the sections is prevented by the tight elastic grip provided by the tube.

In operating position, the free end of a rod-like central electrode 54 terminates in alignment with the free open end of each tubular electrode, as seen for tubular electrode 46 in FIG. 2. The tip 112 of conducting wire 102 projects slightly from insulating sleeve 104 in an axial position radially equidistant in all directions from the wall surface of the electrode tube. When sufficient potential difference is applied between the electrodes submerged in a conducting fluid, a uniform electric current radiates between tip 112 and the wall of the outer electrode. Continual application of a potential difference causes uniform longitudinal erosion of tip 122 and the adjacent portion of insulating sleeve 104. Because the erosion is longitudinal, the gap between tip 112 and the outer electrode wall remains constant, and the radiating electrical current effectively unchanged. When the conducting wire and insulating sleeve erode past a useable length, the inner electrode is easily replaced.

In addition to maintaining a constant gap interval, the downward projecting electrode tubes 42-52 limit the size of bubbles formed at the spark-gaps, and direct the acoustic wave down toward the geologic structure below. As explained above, uniform bubble generation is critical to producing consistent, uniform acoustic pressure pulses; directional control of the acoustic wave is critical to efficient operation of the acoustic source.

An acoustic wave of higher frequency than produced by prior spark gap sources is another advantage of the tubular electrode configuration, resulting from a resonating organ-pipe effect that occurs during bubble generation. In theory the frequency of a closed tube is given by the formula: $f_e = V/4L$, in which:

$f_e$ = fundamental frequency in cycles per second.
$L$ = tube length in inches.
$V$ = velocity in inches per second.

In sea water the velocity $V$ is approximately $5.76(10)^4$ inches per second. For a tubular electrode 3 inches long the fundamental frequency is:

$$f_e = 5.76(10)^4/(4)(3) = 4,800 \text{ cycles per second.}$$

This high frequency component is changed by simply varying the dimensions of the tube. As this relatively high frequency is achieved in the acoustic source 12 by a mechanical effect, independent of the electrical power applied, a tubular electrode configuration results in a substantial increase in efficiency in comparison to prior spark gap sources.

For varying seismic profiling applications, the acoustic source 12 is alternately constructed with any number of electrode pairs. Increasing the number of electrode pairs produces an additive effect, yielding maximum acoustical energy for a given electrical energy input. The individual acoustic waves, produced simultaneously by each electrode pair, combine into a single front as they travel away from the source. Because each individual wave is precisely directed in line with the other waves, the additive effect is complete, with minimal loss of acoustic energy in the combined wave front.

Actual seismic profiling, as described with reference to FIG. 1, is performed by submerging the acoustic source in sea water 16 behind towing vessel 10. An electrical cable 18 connects the acoustic source to electronic components 22 within the vessel. These components include an electrical energy source similar to those used in the prior art. One commonly used energy source is a capacitor bank charged by a high voltage d.c. generator. A trigger circuit connects the capacitor bank to the acoustic source at timed intervals, discharging the capacitors through the gaps between the electrode pairs, and generating an acoustic pressure pulse.

Seismic profiling in shallow water requires a high repetition rate acoustic discharge with a constant output intensity. To maintain a constant output intensity the capacitor bank must charge fully before each discharge. As system efficiency decreases, the size of the capacitor bank increases, and more current is required for full charging. A powerful generator is necessary to supply the required current in the short time essential to a high repetition rate. Because of space and weight restrictions on vessels operating in shallow water, a high repetition rate is possible only with an efficient acoustic source yielding a maximum acoustic output from a less powerful, lightweight electrical source. The directional, multi-electrode acoustic source shown in FIGS. 1-3 yields a high repetition rate acoustic discharge with a constant output when powered by a relatively small electrical power supply. For this reason, it enables seismic profiling from small vessels in previously inaccessible areas.

Although, for convenience, this invention is described by reference to a single, specific, preferred embodiment, numerous modifications within the scope of the invention are expected. For example, a circular electrode array might be substituted for the linear array. Square or hexagonal tubular electrodes might be substituted for the cylindrical electrodes, and small concentric tubes for the wire electrodes shown. Sequential electrode discharge might be substituted for synchronous discharge. Sequential discharge of a vertically oriented acoustic source might be used to generate additive waves in a narrow, concentrated frontal area. These and other modifications will be obvious to the skilled worker in the art. For this reason, the invention is limited only by the scope of the following claims.

I claim:

1. An acoustic source comprising:

a conducting tubular electrode, open at one end, closed at the other end, and having at least one relief opening between the ends to enable ambient fluid to flow into or out of the electrode, a conducting rod-like electrode of smaller diameter than the tubular electrode, positioned concentrically within, and extending substantially the entire length of the tubular electrode to a point beyond the relief opening, means for supporting the rod-like electrode near the closed end of the tubular electrode, means for electrically insulating the tubular and rod-like electrodes from one another at the means for supporting, and conducting means for applying an electrical potential difference between the tubular and rod-like electrodes.

* * * * *